United States Patent
Ellis et al.

(10) Patent No.: US 6,428,105 B1
(45) Date of Patent: Aug. 6, 2002

(54) MESH VEHICLE SEATS

(75) Inventors: Michael Gousotti Ellis, Plymouth; Thomas Scott, Bloomfield Hills, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/711,978

(22) Filed: Nov. 14, 2000

Related U.S. Application Data

(60) Provisional application No. 60/175,325, filed on Jan. 10, 2000.

(51) Int. Cl.$^7$ .................................................. A47C 7/02
(52) U.S. Cl. ............................. 297/452.13; 297/440.11; 297/440.2; 297/452.56
(58) Field of Search ....................... 297/452.13, 452.11, 297/452.14, 452.38, 452.48, 452.56, 461, 462, 440.1, 440.11, 440.15, 440.2, 452.2, 440.22, 452.58, 452.59

(56) References Cited

U.S. PATENT DOCUMENTS

| | | | |
|---|---|---|---|
| 2,693,227 A | | 11/1954 | Holland |
| 2,993,733 A | | 7/1961 | Pinkham |
| 3,295,890 A | | 1/1967 | Murdoch |
| 3,695,707 A | * | 10/1972 | Barecki et al. ...... 297/452.2 X |
| 4,365,840 A | * | 12/1982 | Kehl et al. .......... 297/452.48 X |
| 4,676,551 A | * | 6/1987 | McDowell .............. 297/461 X |
| 4,875,736 A | * | 10/1989 | Brambilla ................ 297/440.1 |
| 5,647,637 A | * | 7/1997 | Jay et al. ............. 297/440.2 X |
| 5,662,383 A | | 9/1997 | Hand |
| 6,106,071 A | * | 8/2000 | Aebischer et al. .. 297/452.26 X |
| 6,135,562 A | * | 10/2000 | Infanti ............... 297/452.14 X |
| 6,220,661 B1 | * | 4/2001 | Peterson ............ 297/440.11 X |

* cited by examiner

Primary Examiner—Peter M. Cuomo
Assistant Examiner—Stephen Vu
(74) Attorney, Agent, or Firm—Damian Porcari

(57) ABSTRACT

A mesh vehicle seat for a specialty vehicle is provided. The mesh vehicle seat has a base and back that are each covered by a fabric web. The base includes a seat form member and bottom plate that are secured together to retain the seat fabric web on the base. The back includes a back frame 26 to which a front and rear clamp members are secured to retain a back fabric web on the back. A concave lower back support is provided to impart a concave shape to the back of the seat in conjunction with concave lower portions of the front and rear clamps. The seat may be provided on a single pedestal base or a double pedestal base.

8 Claims, 4 Drawing Sheets

MESH VEHICLE SEATS

CROSS-REFERENCE TO RELATED APPLICATIONS

This application claims the benefit of U.S. Provisional application Serial No. 60/175,325, filed Jan. 10, 2000.

TECHNICAL FIELD

The present invention relates to seats for vehicles.

BACKGROUND ART

Vehicles are generally provided with seats having a seat structure covered by cloth, vinyl or leather. Conventional vehicle seats are generally made with foam bodies or spring and padding construction. Such seats are relatively expensive to manufacture and are relatively heavy. Structural foam seats generally have a backing of metal or plastic and have achieved some cost savings and weight reduction compared to spring structure seats.

When conventional seats are exposed to sunlight, the surface of the seats becomes hot and may be uncomfortable to sit on. Vinyl or leather seats can be uncomfortable to sit on for extended periods of time, especially if it is warm since there is no convenient way to provide ventilation of the seat surface when a person is sitting on a seat.

Specialty vehicles such as golf carts and utility vehicles generally are provided with foam seats that are vinyl covered. The weight of such seats increases the load carried by the vehicle and may reduce the range of electric powered vehicles. The use of conventional seats also tends to limit design flexibility.

These and other problems and disadvantages are addressed by applicants' invention as summarized below.

DISCLOSURE OF INVENTION

According to the present invention, a seat for a specialty vehicle is provided that comprises a base having a seat form member, a bottom plate, and a seat fabric web. The fabric web is stretched over the seat form member and captured between the seat form member and the bottom plate. A back of the seat has a back frame, a front clamp member, a rear clamp member and a back fabric web. The back fabric web is stretched over the front clamp member and is entrained around the back frame and captured between the front and rear clamp members.

According to further aspects of the invention, the seat form member may be a generally inverted cup shape member having a cylindrical outer wall and a shallow recess defined by a top surface that is spanned by the seat fabric to provide a flexible seating area. An opening may be formed in the top surface that has a flange extending downwardly from the top surface that is coaxial with the outer wall. The bottom plate may have a raised portion located radially inwardly from an outer edge thereof and a centrally disposed circular opening. The cylindrical outer wall of the seat form member is received on the bottom plate radially outwardly of the raised portion and the flange extending downwardly from the opening is received by the centrally disposed circular opening in the bottom plate.

According to other aspects of the invention, the seat back frame is secured to the base. The seat back frame is a generally inverted U-shape member having right and left legs extending downwardly that are adapted to be secured to the base. A lower back support member extends across the seat back frame between the right and left legs. The seat back frame may be secured to a base support ring and the base is secured to the base support ring. The lower back support member is secured to the base support ring and right and left legs with the lower back support member extending between right and left legs above the support ring. The lower back support is secured to the ring in front of the right and left legs of the seat back frame. The lower back support member is concave in the forward direction to provide a concave surface over which the back fabric web is stretched. The front clamp member has a first concave lower portion and the rear clamp member has a second concave lower portion that are secured to the concave surface of the lower back support member between the right and left legs.

According to another aspect of the invention, the seat may be secured to a pedestal that may be either a single pedestal or a double pedestal on which two seats are supported.

These and other aspects of the invention may be better understood in view of the attached drawings and in light of the following detailed description of the invention.

DETAILED DESCRIPTION OF THE PREFERRED EMBODIMENTS

Figure 1:
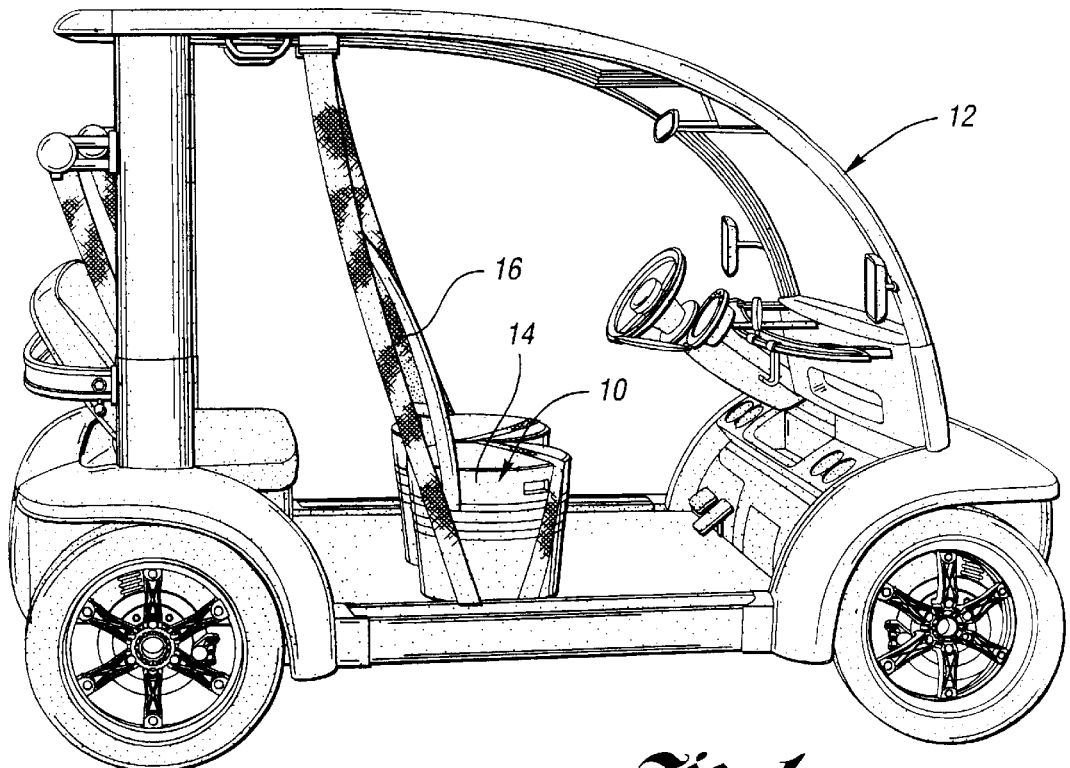
FIG. 1 is a side perspective view of a specialty vehicle having mesh vehicle seats made in accordance with the present invention.
Figure 2:
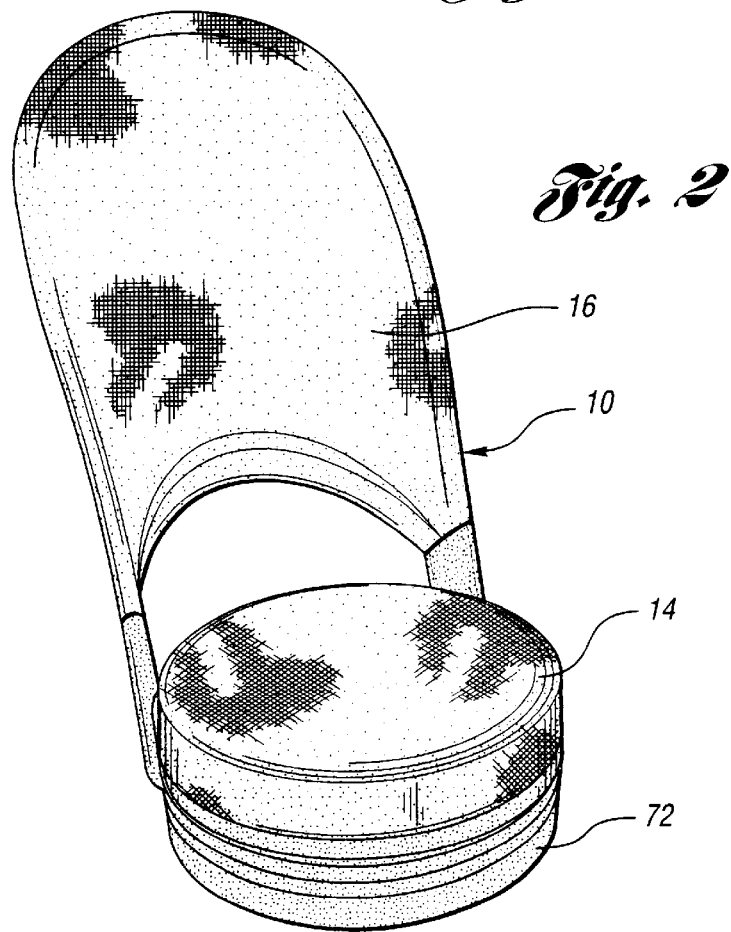
FIG. 2 is a front perspective view of a vehicle seat made in accordance with the present invention.

Referring now to FIGS. 1 and 2, the mesh vehicle seat is generally indicated by reference numeral 10 and is shown installed in a specialty vehicle generally indicated by reference numeral 12. The mesh vehicle seat 10 includes a base 14 and a back 16.

Figure 3:
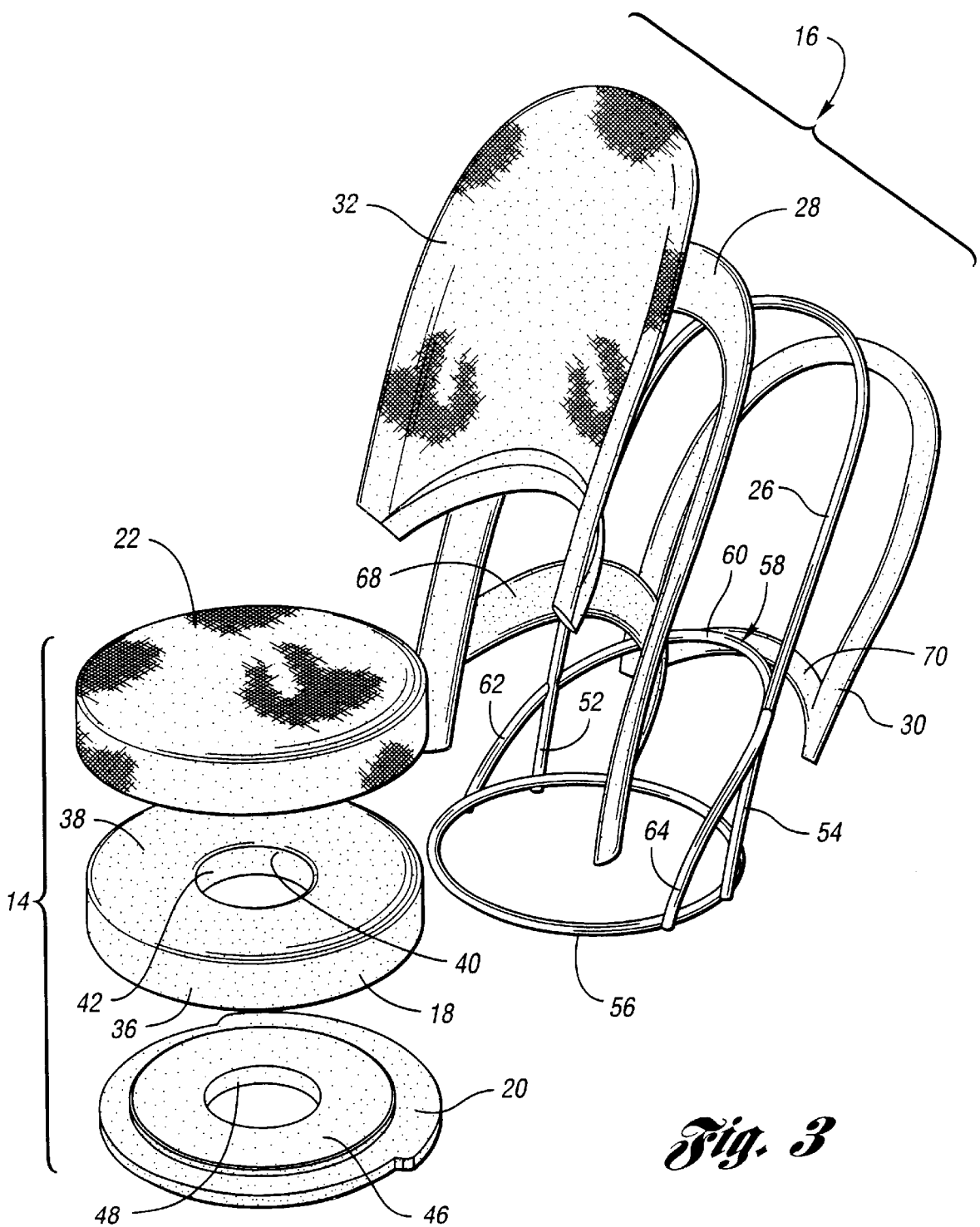
FIG. 3 is an exploded perspective view of the component parts of the vehicle seat made in accordance with the present invention.
Figure 4:
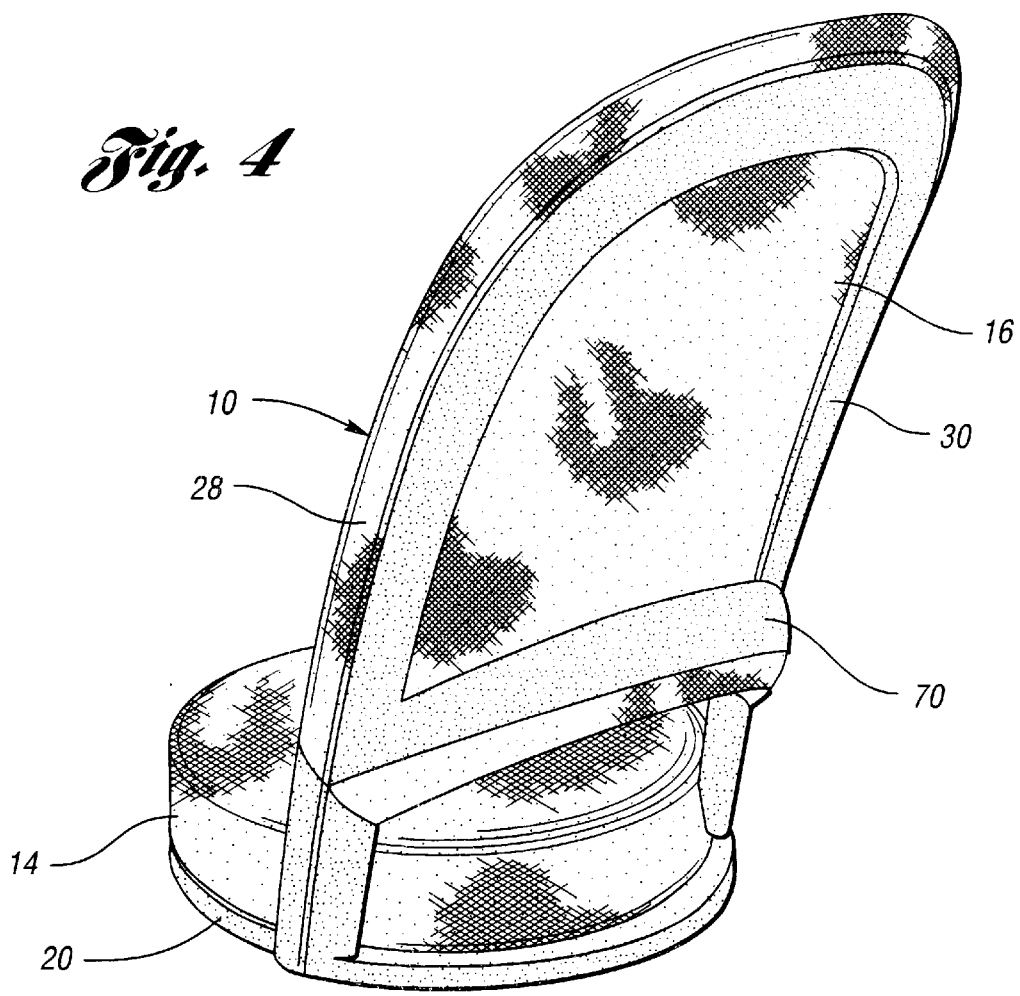
FIG. 4 is a rear perspective view of a vehicle seat made in accordance with the present invention.

Referring now to FIGS. 3 and 4, the vehicle seat 10 of the present invention is shown to include a base 14 and back 16 that are shown in exploded perspective. The base 14 includes a seat form member 18 and a bottom plate 20, are secured together after a seat fabric web 22 is placed over the seat form member 18. The seat form member 18, bottom plate 20 and seat fabric web 22 are snapped together and may also be retained by means of glue or fasteners such as heat stakes, rivets or screws.

The back 16 includes a back frame 26, front clamp member 28, rear clamp member 30 and back fabric web 32. The back fabric web 32 is placed over the front clamp member 28, wrapped around and secured to the back frame 26. The rear clamp member 30 is assembled to the back frame 26 and front clamp member 28 to finish the rear of the seat and also assist in holding the back fabric web 32 in place.

The seat form member 18 has a cylindrical wall 38 extending downwardly from a top surface 38. The top surface 38 is recessed to provide clearance between the top surface 38 and the seat fabric web 22. An opening 40 is provided in the center of the seat form member 18 and has a downwardly extending flange 42 that is generally cylindrical in shape and coaxial with the cylindrical outer wall 36. The bottom plate 20 has a raised portion 46 spaced inwardly from the outer edge of the bottom plate 20. A central opening 48 is provided in the bottom plate 20. The cylindrical outer wall 36 of the seat form member 18 is received on the bottom plate 20 outboard of the raised portion 46. Flange 42 of the seat form member 18 is received in the central opening 48. The seat fabric web 22 is captured between the lower edge of the cylindrical outer wall 36 and the bottom plate 20.

The back frame 26 is generally formed in an inverted U-shape with right and left legs 52, 54, extending downwardly to the seat base 14. A base support ring 56 is secured to the back frame 26 with the right and left legs 52, 54 and secured by welding or fasteners to the base support ring 56.

A lower back support 58 has a central portion that is concave in the forward direction. Right and left extension 62, 64 extend forward of the right and left legs 52, 54 and are connected by welding or fasteners to the base support ring 56 in front of the right and left legs 52, 54.

The front clamp member 28 has a concave lower portion 68 that follows the contour of and is attached to the center portion 60 of the lower back support 58. The rear clamp member 30 includes a concave lower portion 70 that is fitted over the rear surface of the center portion 60 of the lower back support 58. The back fabric web 32 is installed over the front clamp member 28 and concave lower portion 68 of the front clamp member 28.

Figure 5:
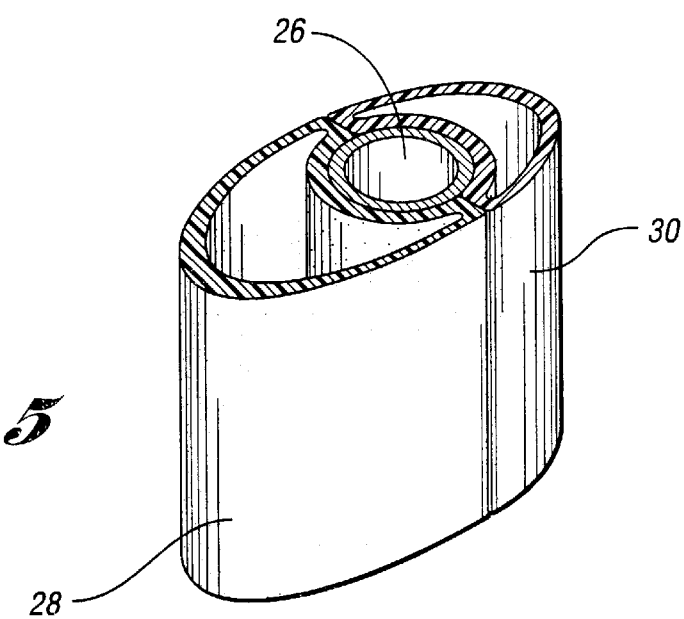
FIG. 5 is a cross-sectional view of a portion of the seat back showing the back frame and front and rear clamp members.

Referring now to FIG. 5, the structure of the back 16 is shown to include the back frame 26 that is captured between the front clamp member 28 and rear clamp member 30. The back fabric web 32 is secured to the back frame 26 and held in place by means of the front and back clamp members 28, 30.

Referring now to FIG. 2, the seat is shown with a pedestal base 72 for one seat. The pedestal base 72 may be of greater or lesser height to provide the proper seating level for the base 14.

Figure 6:
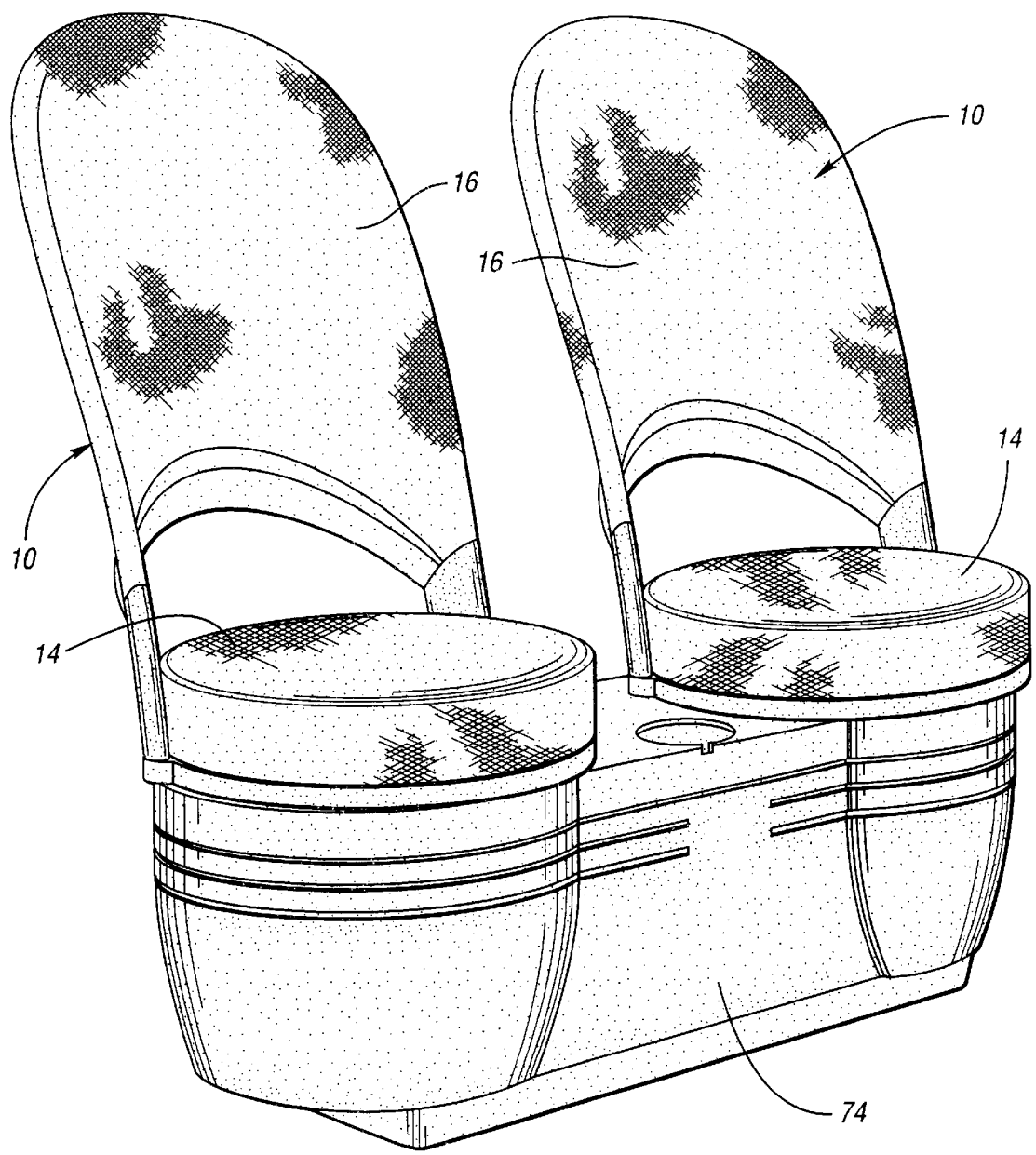
FIG. 6 is a perspective view of a pair of vehicle seats secured to a double pedestal.

Referring now to FIG. 6, a double pedestal base 74 is shown on which two mesh vehicle seats 10 are secured. The mesh vehicle seats 10 include a base 14 and back 16. The mesh vehicle seats 10 are preferably secured by fasteners or glue to the double pedestal base 74.

While the best mode for carrying out the invention has been described in detail, those familiar with the art to which this invention relates will recognize various alternative designs and embodiments for practicing the invention as defined by the following claims.

What is claimed is:

1. A seat for a specialty vehicle comprising:
a base having a seat form member, a bottom plate, and a seat fabric web, the seat fabric web being stretched over the seat form member and captured between the seat form member and the bottom plate, the seat form member is a generally inverted cup shaped member having a cylindrical outer wall and a shallow recess defined by a top surface that is spanned by the seat fabric web to provide a flexible seating area;
a back having a back frame, a front clamp member, a rear clamp member and a back fabric web, the back fabric web being stretched over the front clamp member and being entrained around the back frame and captured between the front and rear clamp members.

2. The seat for a specialty vehicle of claim 1 wherein an opening is formed in the top surface that has a flange extending downwardly from the top surface coaxial with the outer wall.

3. A seat for a specialty vehicle comprising:
a base having a seat form member, a bottom plate, comprising a generally disk shaped member having a raised portion located radially inwardly from an outer edge of the bottom plate and a centrally disposed circular opening, the seat form member having a cylindrical outer wall and an opening formed in a top surface that has a flange extending downwardly from the top surface, the cylindrical outer wall being received on the bottom plate radially outwardly of the raised portion and the flange being received by the centrally disposed circular opening in the bottom plate and a seat fabric web, the seat fabric web being stretched over the seat form member and captured between the seat form member and the bottom plate; and
a back having a back frame, a front clamp member, a rear clamp member and a back fabric web, the back fabric web being stretched over the front clamp member and being entrained around the back frame and captured between the front and rear clamp members.

4. A seat for a specialty vehicle comprising:
a base having a seat form member, a bottom plate, and a seat fabric web, the seat fabric web being stretched over the seat form member and captured between the seat form member and the bottom plate; and
a back having a seat back frame that is a generally inverted U-shaped member having right and left legs extending downwardly that are adapted to be secured to a base support ring, a front clamp member, a rear clamp member and a back fabric web, the back fabric web being stretched over the front clamp member and being entrained around the back frame and captured between the front and rear clamp members.

5. The seat for a specialty vehicle of claim 4 wherein a lower back support member extends across the seat back frame between the right and left legs.

6. A seat for a specialty vehicle comprising:
a base having a seat form member, a bottom plate, and a seat fabric web, the seat fabric web being stretched over the seat form member and captured between the seat form member and the bottom plate;
a back having a seat back frame, a front clamp member, a rear clamp member and a back fabric web, the back fabric web being stretched over the front clamp member and being entrained around the back frame and captured between the front and rear clamp members;
a base support ring, wherein the seat back frame has a right leg and a left leg that are secured to the base support ring, the base being secured to the base support ring; and
wherein a lower back support member is secured to the base support ring and the right and left legs, the lower back support member extending between the right and left legs above the support ring and being secured to the ring in front of the right and left legs.

7. The seat for a specialty vehicle of claim 6 wherein the lower back support member is concave in the forward direction to provide a concave surface over which the back fabric web is stretched.

8. The seat for a specialty vehicle of claim 7 wherein the front clamp member has a first concave lower portion and the rear clamp member has a second concave lower portion that are secured to the concave surface of the lower back support member between the right and left legs.

* * * * *